United States Patent [19]

Szlaga et al.

[11] Patent Number: 4,883,103

[45] Date of Patent: Nov. 28, 1989

[54] FILLER NECK SEALING ASSEMBLY

[75] Inventors: Emil Szlaga; Robert S. Harris; Robert H. Thompson, all of Connersville, Ind.

[73] Assignee: Stant Inc., Connersville, Ind.

[21] Appl. No.: 148,384

[22] Filed: Jan. 25, 1988

Related U.S. Application Data

[63] Continuation-in-part of Ser. No. 106,632, Oct. 8, 1987, Pat. No. 4,816,045, which is a continuation-in-part of Ser. No. 846,081, Mar. 31, 1986, Pat. No. 4,707,164.

[51] Int. Cl.$^4$ ................................................ B67D 5/04
[52] U.S. Cl. ................................... 141/368; 141/312; 141/369; 220/86 R; 220/855 P; 277/166; 277/152
[58] Field of Search ............... 141/312, 311 R, 44–46, 141/286, 392, 368, 369–371; 220/85 V R, 85 V S, 86 R, DIG. 33, 855 P, 85 F, 304, 288, 378; 277/152, 153, 166

[56] References Cited

U.S. PATENT DOCUMENTS

| | | | |
|---|---|---|---|
| 2,174,075 | 9/1939 | Borchardt | 277/166 |
| 2,282,312 | 5/1942 | Halstead | 277/166 |
| 3,393,917 | 7/1968 | Kendall et al. | 277/166 |
| 3,478,922 | 11/1969 | Mole | 220/86 R |
| 3,543,484 | 12/1970 | Davis | 55/387 |
| 3,748,829 | 7/1973 | Joyce et al. | 55/74 |
| 3,911,977 | 10/1975 | Berger | 141/348 |
| 3,920,250 | 11/1975 | Eklund | 277/152 X |
| 3,921,412 | 11/1975 | Heath et al. | 62/54 |
| 3,964,754 | 6/1976 | Murgi et al. | 277/166 X |
| 4,055,352 | 10/1977 | Allingunt et al. | 277/152 |
| 4,142,647 | 3/1979 | Walters | 220/85 S |
| 4,232,715 | 11/1980 | Pyle | 141/1 |
| 4,323,166 | 4/1982 | Maeroff | 220/86 R |
| 4,424,839 | 1/1984 | Otani et al. | 141/348 |
| 4,630,749 | 12/1986 | Armstrong et al. | 220/86 R |
| 4,651,889 | 3/1987 | Uranishi et al. | 220/85 R |
| 4,701,198 | 10/1987 | Uranishi et al. | 55/387 |
| 4,702,386 | 10/1987 | Boehmer et al. | 220/86 R |
| 4,707,164 | 11/1987 | Harris | 141/286 X |
| 4,714,172 | 12/1987 | Morris | 220/86 R |
| 4,741,369 | 5/1988 | Dawson | 141/286 |
| 4,770,677 | 9/1988 | Harris | 55/168 |
| 4,816,045 | 3/1989 | Szlaga et al. | 55/168 |

FOREIGN PATENT DOCUMENTS 999247  11/1976  Canada .......................... 220/86 R

*Primary Examiner*—Ernest G. Cusick
*Attorney, Agent, or Firm*—Barnes & Thornburg

[57] ABSTRACT

A sealing assembly is provided for use in a filler neck sized to receive a fuel-dispensing nozzle. The sealing assembly includes a sealing ring between the filler neck and a fuel-dispensing nozzle and a support for locating the seal in the filler neck to define in the filler neck an outer chamber communicable with the atmosphere and an inner chamber. The seal is configured to admit the fuel-dispensing nozzle into the inner chamber without coupling the inner and outer chambers in vapor communication. The sealing assembly partitions a fuel-conducting passageway in the filler neck to limit flow of vapors and gases through the passageway during dispensing of fuel into the filler neck and past the sealing assembly.

6 Claims, 2 Drawing Sheets

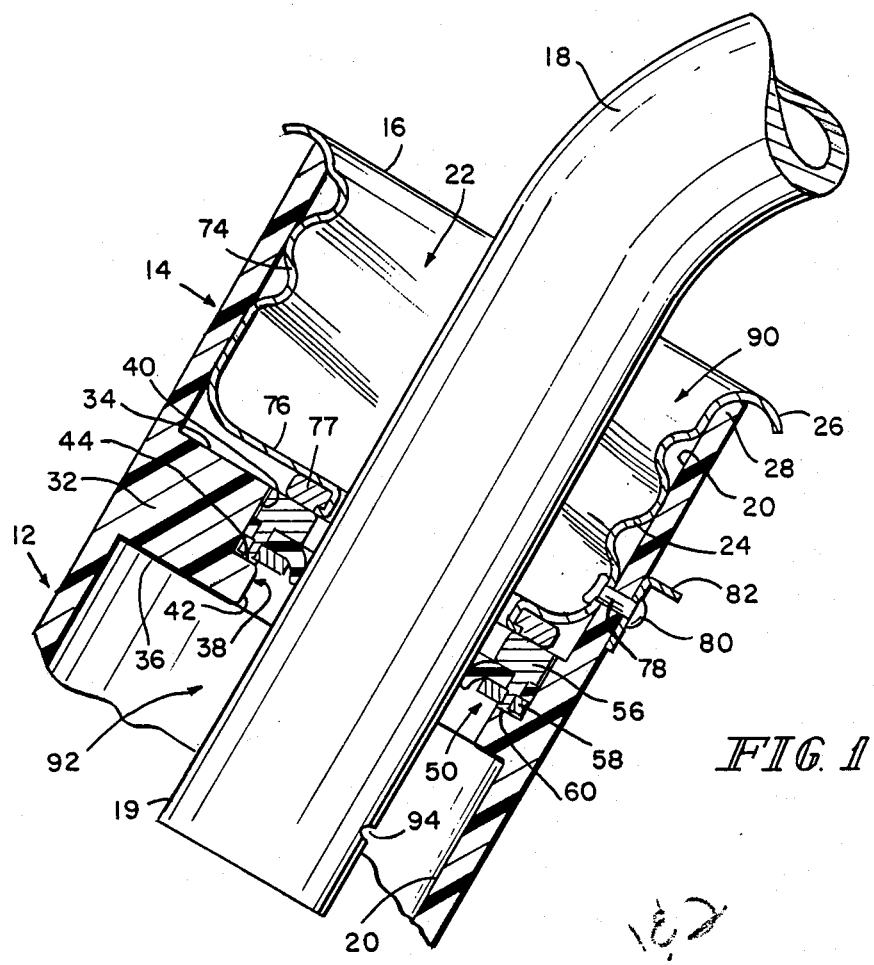
FIG. 1
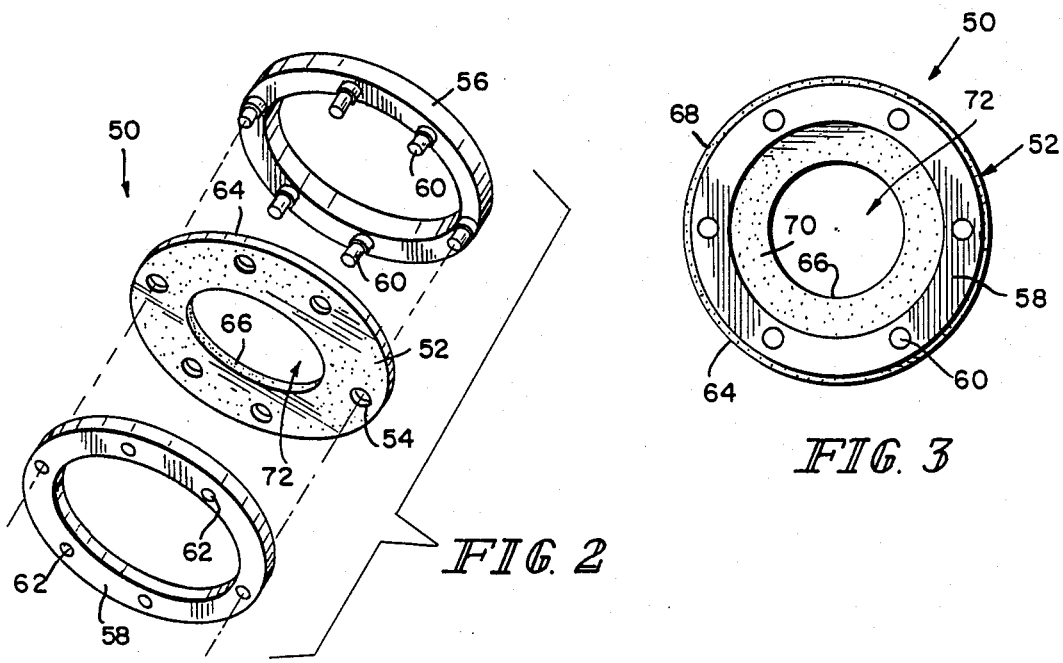
FIG. 2
FIG. 3

FILLER NECK SEALING ASSEMBLY

This is a continuation-in-part of U.S. Pat. No. 4,816,045, issued Mar. 28, 1989, which is a continuation-in-part of U.S. Pat. No. 4,770,677, issued Sept. 13, 1988.

BACKGROUND AND SUMMARY OF THE INVENTION

The present invention relates to a sealing assembly in a filler neck, and particularly to means for establishing a seal between the filler neck and a liquid-dispensing nozzle in the filler neck. More particularly, the present invention relates to a sealing assembly in a vehicle fuel system filler neck for sealingly admitting a fuel-dispensing nozzle into the filler neck without permitting substantial exhaustion of fuel vapors in the filler neck to the atmosphere or admission of atmospheric pressure into the fuel system through the filler neck.

Polluting emissions are released into the atmosphere during each and every motor vehicle refueling activity through the mouth of the filler neck. In view of the frequency of vehicle refueling activities, it will be appreciated that a significant quantity of otherwise combustible fuel is lost to the atmosphere each time a vehicle is refueled.

New fuel vapors are generated during refueling due to splash and agitation of the dispensed fuel, as well as from potential temperature differences between the fuel tank and the dispensed fuel. In addition, as the liquid fuel dispensed at the pump fills the vehicle fuel tank, fuel vapors that are present in the tank and generated during refueling are displaced by liquid fuel. These displaced fuel vapors are moved out of the fuel tank vapor space by the displacing action of the liquid fuel. In conventional vehicle fuel systems, these displaced vapors are released directly into the atmosphere via the fuel tank filler neck and are a contributing factor to air pollution.

Conventional filler necks and fuel tank assemblies on vehicles are not configured to control this escape of fuel vapor effectively during the refilling process. Generally, the filler neck of a vehicle has a diameter greater than the diameter of the fuel-dispensing nozzle. Because of the relatively large diameter of the filler neck with respect to the fuel-dispensing nozzle, the fuel vapor created by fuel dispensed into the fuel tank through the filler neck escapes out through the filler neck and to the atmosphere substantially continuously during the filling operation. This creation of fuel vapor during the refueling process has recently been recognized as a major contributor to pollution of the atmosphere, especially with newer, more volatile blends of vehicle fuel.

Attempts have been made to control this escape of fuel vapor during the filling process by adapting the service station fuel-dispensing nozzle to include a vapor recovery portion which captures the escaping fuel vapor and prevents the fuel vapor from escaping into the atmosphere. Such conventional methods of capturing the escaping fuel vapor have generally proven unsatisfactory because of the complexity of the system and because of relatively poor vapor-capturing characteristics of the system. It is generally recognized that for satisfactory fuel vapor control during refilling, a system must be provided which is on-board the vehicle for capturing and controlling such fuel vapor generated during refilling. Ideally, such a system would work automatically without any operator supervision.

Another problem with conventional filler neck and fuel tank assemblies is that it is sometimes extremely difficult to achieve accurate filling levels because of poorly designed filler neck seals which leak, resulting in an inability to maintain any vacuum that might develop in the filler neck itself during introduction of fuel into the filler neck. Conventional fuel nozzles are often equipped with vacuum-actuated systems that shut off flow of fuel through the nozzle upon exposure of a sensor in the nozzle to a predetermined negative pressure. Typically, the splashed back fuel enters and blocks a conduit formed in the nozzle to lie in communication with the sensor to generate the negative pressure, thereby shutting off fuel flow.

Relying upon fuel splash-back provides generally unsatisfactory fill level consistency because such fuel splash back is dependent upon a number of factors. Such factors include the flow rate of the nozzle, the configuration and routing of the filler neck, and the general orientation of the filler neck with the fuel tank, as well as fuel-dispensing nozzle sensitivity. Because of such inconsistency in achieving accurate fill levels, it would be advantageous to provide a nozzle shutoff control system having an improved means for providing a negative pressure signal to a vacuum-actuated shutoff sensor which would ideally permit the fuel tank to be filled to accurate, consistent fill levels during each refueling operation.

One object of the present invention is to provide a sealing assembly for partitioning a fuel-conducting passageway in a filler neck to limit flow of vapors and gases through the passageway during dispensing of fuel into the filler neck and past the sealing assembly.

Another object of the present invention is to provide a sealing assembly for preventing fuel vapor loss to the atmosphere through the filler neck during refueling in cooperation with a fuel vapor recovery system.

Yet another object of the present invention is to provide a sealing assembly for blocking communication of an inner chamber of the filler neck with the atmosphere during refueling to maintain a negative pressure condition in the inner chamber in cooperation with a vapor-handling system to enhance operation of a vacuum-actuated nozzle shutoff system communicating with the inner chamber.

According to the present invention, a sealing assembly is provided for use in a filler neck sized to receive a fuel-dispensing nozzle. The sealing assembly includes means for establishing a seal between the filler neck and a fuel-dispensing nozzle and means for locating the establishing means in the filler neck to define in the filler neck an outer chamber communicable with the atmosphere and an inner chamber. The establishing means is configured to admit the fuel-dispensing nozzle into the inner chamber without coupling the inner and outer chambers in vapor communication.

In preferred embodiments, the filler neck includes an inner wall defining a nozzle-receiving passageway and means coupled to the inner wall for supporting the establishing means. The supporting means provides a first sealing surface and a fuel-dispensing nozzle insertable into the nozzle-receiving passageway provides a second sealing surface. The establishing means communicates with both of the first and second sealing surfaces upon admission of a fuel-dispensing nozzle into the inner chamber through the outer chamber to define a vapor and atmosphere seal between the filler enck and the nozzle.

In one preferred embodiment, the supporting means is unitarily appended to the inner wall to prevent flow of any fuel vapor and atmosphere between the filler neck and the supporting means. The establishing means is provided by a sealing ring having an outer perimeter edge providing means for sealing against the first sealing surface on the supporting means and an inner perimeter edge defining a central nozzle-receiving aperture. The inner perimeter edge provides means for sealing against the second sealing surface on the nozzle.

One feature of the present invention is the provision in a filler neck of seal-establishing means for admitting a fuel-dispensing nozzle into an inner chamber in the filler neck without coupling the inner chamber to the atmosphere through the filler neck mouth. One advantage of such a sealing system is that it helps to prevent fuel vapor loss through the filler neck during operation of an on-board vehicle fuel vapor recovery system by blocking flow of pressurized fuel vapor in the filler neck to the atmosphere during refueling. Another advantage of this sealing system is that it cooperates with a vapor-handling system in a vehicle fuel system to maintain any negative pressure condition that develops in the inner chamber during refueling to enhance the operation of a vacuum-actuated nozzle shutoff system having its shutoff sensor communicating with the inner chamber.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a longitudinal sectional view of a preferred embodiment of the present invention showing a fuel-dispensing nozzle inserted into a filler neck during refueling;

FIG. 2 is an exploded view of the embodiment of FIG. 1 illustrating the assembly of a pair of mounting rings onto a sealing ring;

FIG. 3 is an elevation view of the rings shown in FIG. 2 following assembly.

DETAILED DESCRIPTION OF THE DRAWINGS

Figure 4:
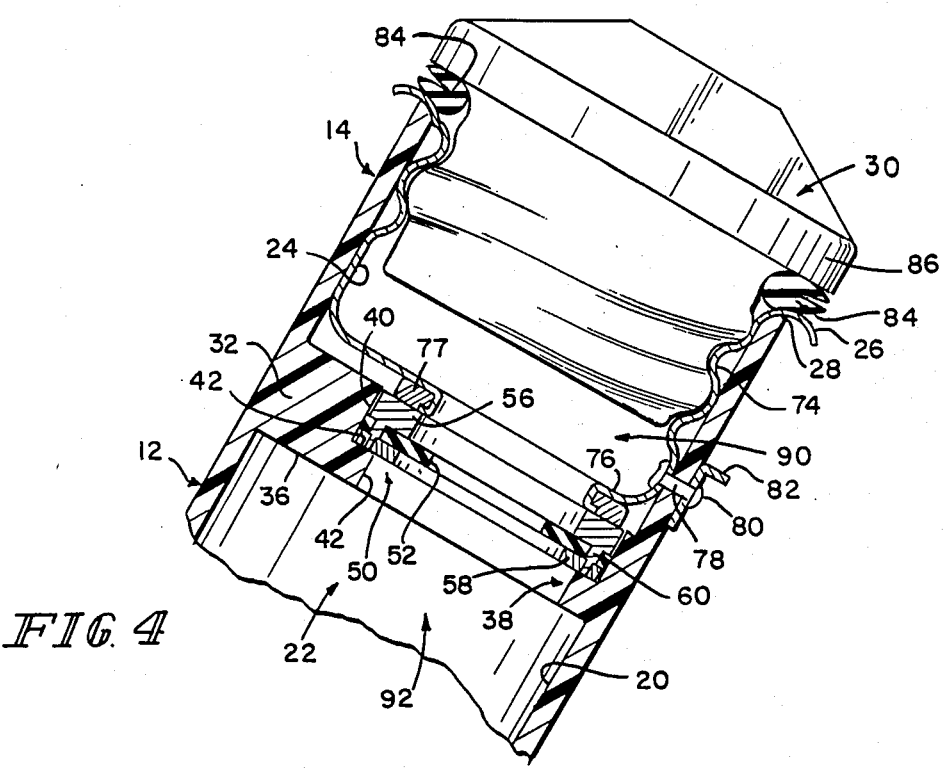
FIG. 4 is a longitudinal sectional view similar to the view in FIG. 1 showing a fuel cap mounted on a filler neck in a fully tightened position during normal non-refueling activities.

The sealing assembly of the present invention advantageously admits a fluid-dispensing nozzle into a filler neck without allowing pressurized vapors in the filler neck generated during refueling to escape to the atmosphere and without allowing dissipation of any vacuum that may be created in the filler neck during a filling operation. In preferred embodiments, the sealing assembly is positioned in the filler neck of a vehicle fuel system having a fuel tank in communication with the filler neck. In such an environment, the sealing assembly effectively forms a barrier interconnecting the filler neck and a fuel-dispensing nozzle in the filler neck to limit flow of fuel vapor and atmosphere into and out of the filler neck during refueling.

A fuel tank filler neck 12 having a distal end 14 formed to include a mouth 16 for receiving a fuel-dispensing nozzle 18 is shown in FIG. 1. Filler neck 12 includes an inner wall 20 defining a nozzle-receiving passageway 22. Threaded insert 24 is dropped into passageway 22 so that its peripheral flange 26 rests on the annular lip 28 of mouth 16. Insert 24 provides means for threadedly receiving a fuel cap 30 to close the mouth 16 of the filler neck 12 as shown in FIG. 4.

Annular partition 32 is unitarily formed with filler neck 12 and situated in passageway 22 to extend in a radially inward direction from its roots along inner wall 20. Partition 32 is formed to include outer face 34, inner face 36, and a stepped annular side wall 38 interconnecting faces 34 and 36. Annular side wall 38 defines first and second axially extending, radially inwardly facing, annular surfaces 40, 42 and a radially inwardly extending, outwardly facing, annular surface 44. Surfaces 40 and 44 are orthogonal and cooperate to define an annular ring-receiving groove.

A ring assembly 50 is installable in the annular groove formed by surfaces 40 and 44 to form a sealed vapor flow barrier between partition 32 and nozzle 18 upon insertion of nozzle 18 into its fuel-dispensing position in passageway 22. Ring assembly 50 includes a sealing ring 52 having a plurality of circumferentially spaced, rivet-receiving holes 54 and a pair of mounting rings 56, 58. The rings 52, 56, 58 are concentrically aligned prior to assembly as shown in FIG. 2 so that rivets 60 on mounting ring 56 will pass through holes 54 in sealing ring 52 to be received in companion holes 62 formed in mounting ring 58. In this way, the sealing ring 52 is securely trapped between the two mounting rings 56, 58 to provide ring assembly 50.

Referring to FIG. 3, it will be seen that the outer diameter of sealing ring 52 defined by outer edge 64 is greater than the outer diameter of either of mounting rings 56, 58. Also, the inner diameter of sealing ring 72 defined by inner edge 66 is less than the inner diameter of either of mounting rings 56, 58. Upon interconnection of rings 56, 58 using rivets 60 to trap the sealing ring 52 therebetween, the outer boundary edges of mounting rings 56, 58 cooperate to define an inner annular sealing portion 68 and the inner boundary edges of mounting rings 56, 58 cooperate to define an inner annular sealing portion 70.

Upon assembly of ring assembly 50 into the ring-receiving groove defined by surfaces 40 and 44 as shown in FIG. 1, the outer annular sealing portion 68 will deflect somewhat relative to the rigid, interconnected mounting rings 56, 58 to establish sealing engagement with first sealing surface 40. Such deflection occurs uniformly around the circumference of sealing ring 52 since the outer diameter of sealing ring 52 defined by outer edge 64 is slightly greater than the inner diameter of the aperture defined by annular surface 40. Mounting rings 56, 58 can be attached to filler neck 12 in the position illustrated in FIG. 1 using any suitable means to retain the outer annular sealing portion 68 in sealing engagement with surface 40 to prevent flow of liquid fuel, fuel vapors, or atmosphere between sealing ring 52 and surface 40 of filler neck 12.

Inner edge 66 of sealing ring 52 defines a central aperture 72 sized to receive a fluid-dispensing nozzle 18 therethrough. As shown in FIG. 1, the inner diameter of sealing ring 52 defined by inner edge 66 is slightly less than the outer diameter or dimension of nozzle 18 so that the inner annular sealing portion 70 will deflect somewhat relative to the rigid, interconnected mounting rings 56, 58 upon insertion of nozzle 18 into the central aperture 72 of sealing ring 52.

Sealing ring 52 is made of a resilient sealing material such as flurosilicone so that it will sealingly engage a sealing surface 19 provided by the outer circumference of nozzle 18 to establish a circumferentially extending fuel vapor and atmosphere barrier between partion 32 and nozzle 18. Advantageously, central aperture 72 can be configured to receive a wide variety of nozzle sizes (i.e., diameters, cross-sectional shapes, and configurations) due to the resilient, expandable character of the sealing material from which ring 52 is desirably made.

The threaded insert 24 mounted in the distal end 14 of filler neck 12 is desirably provided by a metal cup having a thread-shaped side wall 74 engaging inner wall 20 and a bottom wall 76 coupled to a support ring 77 situated to abut mounting ring 56 and hold the ring assembly 50 in a predetermined position. Metal rivet means 78 or the like is used to attach threaded insert 24 to the filler neck 12. Desirably, a head portion 80 of rivet means 78 is exposed on the exterior of filler neck 12 or otherwise positioned to communicate directly with metal grounding strap 82. Thus, insert 24, rivet means 78, and grounding strap 82 cooperate to provide static eliminator means extending through a wall of the filler neck 12 to ground the system.

The relationship between ring assembly 50 and fuel cap 30 is illustrated in FIG. 4. Sealing ring 52 is situated in passageway 22 in spaced relation to a conventional closure gasket 84 trapped between peripheral flange 26 and an outer portion 86 of fuel cap 30. Typically, gasket 84 is carried by fuel cap 30. Thus, the seal-establishing means provided by sealing ring 52 or the like is exposed upon removal of fuel cap 30 and gasket 84 from the filler neck 12. This exposure permits an operator to establish a sealed barrier in the filler neck passageway 22 in spaced relation to the filler neck mouth 16 by inserting a fuel-dispensing nozzle (e.g., 18) a distance into passageway 22 sufficient to cause the circumference of the exterior surface 19 of nozzle 18 to be sealingly embraced by the inner annular sealing portion 70 of sealing ring 52.

The partition 32 and ring assembly 50 cooperate to divide passage 22 into an outer chamber 90 communicable with the atmosphere through the filler neck mouth 16 and an inner chamber 92 in fluid communication with a fuel tank (not shown) or other portion of a vehicle fuel system or the like. As shown in FIG. 1, sealing ring 52 is configured and positioned to admit a fuel-dispensing nozzle 18 into inner chamber 92 through central aperture 72 without coupling inner and outer chambers 92, 90 in fluid communication. In other words, upon such nozzle insertion, liquid fuel and pressurized fuel vapor in inner chamber 92 is prevented from escaping to the atmosphere through mouth 16 and atmosphere extant in outer chamber 90 is blocked from admission into inner chamber 92.

One advantage produced by inclusion of ring assembly 50 in filler neck passageway 22 is that fuel vapor in inner chamber 92 and the rest of the fuel system connected to inner chamber 92 is unable to be exhausted to the atmosphere through filler neck mouth 16 during refueling. This vapor retention feature is particularly advantageous when used in combination with an on-board vapor recovery system of the type disclosed in U.S. patent application Ser. Nos. 06/846,081 and 07/106,632, which are hereby incorporated by reference. Fuel vapor in inner chamber 92 can be conveniently conducted to an on-board fuel vapor treatment site such as a canister rather than discharged through the filler neck mouth 16 to the atmosphere due to the vapor seal established by partition 32 and sealing ring 52.

Another advantage of the present invention is that provision of a passageway sealing system in the filler neck 12 enhances operation of a vacuum-actuated shutoff system provided in a fuel-dispensing nozzle configured to be inserted into filler neck passageway 22. Referring to FIG. 1, nozzle 18 is formed to include an aperture 94 near its distal end. Typically, such nozzles are equipped with a vacuum-actuated system (not shown) that functions to shut off flow of fuel through the nozzle in response to exposure of aperture 94 to negative pressure in excess of a predetermined magnitude. Reference is hereby made to U.S. patent appication Ser. No. 07/106,632 for a description of a vapor-handling system which functions to provide such a shutoff negative pressure to a filler neck chamber such as inner chamber 92 upon sensing the quantity of fuel in the fuel system to actuate a nozzle-based, vacuum-actuated, shutoff system coupled to aperture 94.

Advantageously, the prevent invention provides seal-establishing means 32, 50 for preventing dissipation of any negative pressure that may be created in inner chamber 92 during a fuel-dispensing operation involving insertion of nozzle 18 into filler neck passageway 22. Thus, a vacuum applied to aperture 94 by a vapor-handling system of the type described above is not dissipated during refueling by admission into the inner chamber 92 of atmosphere present in outer chamber 90 due to removal of fuel cap 30.

Although the invention has been described in detail with reference to certain preferred embodiments, variations and modifications exist within the scope and spirit of the invention as described and defined in the following claims.

What is claimed is:

1. A system for communicating fuel from a fuel-dispensing nozzle to a fuel tank, the system comprising:
   a filler neck having an inner wall defining a nozzle-receiving passageway having a mouth, and
   means for dividing the nozzle-receiving passageway into an outer chamber communicable with the atmosphere through the mouth and an inner chamber in fluid communication with the fuel tank, the dividing means including establishing means for forming a liquid fuel and fuel vapor seal to block flow of liquid fuel and fuel vapor through any space between the inner wall of the filler neck and a fuel-dispensing nozzle inserted into the inner chamber through the filler neck mouth so that the fuel dispensing nozzle is admitted into the inner chamber without coupling the inner and outer chambers in fluid communication, the establishing means including an annular seal member having a radially outer perimeter sealingly engaging the inner wall of the filler neck and a circular radially inner perimeter configured to define aperture means for sealingly engaging a fuel-dispensing nozzle received therein, the annular seal member being made of a resilient material and including forward and rearward faces extending between the radially inner and outer perimeters the inner and outer perimeters of the seal moveable independently of each other, and the establishing means further including a first mounting ring abutting the forward face, a second mounting ring abutting the rearward face, and means extending through said resilient material for permanently interconnecting the first and second mounting rings to one another in fixed spaced-apart relation to capture the annular seal member in a permanently fixed position therebetween so that said annular sealing ring and interconnected mounting rings cooperate to define a subassembly mountable in the dividing means to provide a nozzle-sealing apparatus in a filler neck.

2. The system of claim 1, wherein the mounting rings are configured to engage a central portion of the annular seal member intermediate the radially inner and outer perimeters to define an exposed, radially outer, annular boundary portion of the seal member extending between the central portion and the outer perimeter and also an exposed, radially inner, annular boundary portion of the seal member extending between the central portion and the inner perimeter, and the inner and outer boundary portions are deflectable relative to the rigid central portion captured between the mounting rings.

3. In a vehicle fuel system including a fuel tank and a filler neck having a mouth and an inner wall providing a nozzle-receiving passageway for conducting fuel from a fuel-dispensing nozzle to the fuel tank, the improvement comprising sealing means the nozzle-receiving passageway for sealing against the fuel-dispensing nozzle to define an inner chamber in the filler neck communicating with the mouth of the fuel-dispensing nozzle and the fuel tank without communicating with the atmosphere through the filler neck mouth so that fuel vapor in the inner chamber is not exhausted to the atmosphere through the filler neck mouth during introduction of fuel into the fuel tank by the fuel-dispensing nozzle, the sealing means including a partition member positioned in the nozzle-receiving passageway and appended to the filler neck to block flow of fuel vapor between the partition member and the filler neck, an annular seal member, and supporting means for supporting the seal member on the partition member so that the annular seal member acts to establish a first sealing portion between the partition member and a fuel-dispensing nozzle extending through the nozzle-receiving passageway into the inner chamber, the annular seal member being formed to include aperture means for forming a second sealingly portion for admitting the fuel-dispensing nozzle into the inner chamber said first and second sealing portions being moveable independently of one another a plurality of mounting apertures about the aperture means, the supporting means including first and second mounting rings and interconnecting means extending through each mounting aperture formed in the annular seal member for interconnecting the mounting rings in permanently fixed spaced-apart relation relative to one another to capture the annular seal member in a relatively fixed position between the first and second mounting rings, each mounting ring providing a central aperture for admitting the fuel-dispensing nozzle into the inner chamber, and the mounting rings and the annular seal member being arranged and fixed to one another by the interconnecting means to align the central apertures and the aperture means to receive a fuel-dispensing nozzle therethrough.

4. The improvement of claim 3, wherein the seal member is a ring made of resilient material having a radially outer perimeter boundary defining an outer diameter of the seal member and a radially inner perimeter boundary circumscribing the aperture means and defining an inner diameter of the seal member, each of the first and second mounting rings have predetermined radially outer perimeter boundaries defining outer diameters of said rings and predetermined radially inner perimeter boundaries circumscribing the respective central aperture and defining inner diameters of said rings, the seal member and the mounting rings are arranged to align the aperture means and the central aperture in substantially concentric relation, the outer diameter of the seal member is greater than the outer diameters of the first and second mounting rings to define and outer annular sealing portion deflectable in relation to the interconnected first and second mounting rings to sealingly engage the partition member, and the inner diameter of the seal member is less than the inner diameters of the first and second mounting rings to define an inner annular sealing portion deflectable in relation to the interconnected first and second mounting rings to sealingly engage a fuel-dispensing nozzle in the aperture means.

5. An assembly for use in a filler neck having a distal end and defining a mouth and having an inner wall providing a passageway communicating with the mouth, the assembly comprising:

a sealing ring having an inner and outer perimeter edges and a web extending therebetween, the inner and outer perimeters are moveable independently of one another to provide independent sealing areas, the inner perimeter edge is formed to define a central aperture for sealingly receiving a fluid-dispensing nozzle, the web being formed to include a plurality of mounting apertures arranged in circumferentially spaced-apart relation about the central aperture, a pair of mounting rings, each mounting ring having an inner diameter greater than the inner diameter defined by the inner perimeter of the sealing ring and an outer diameter defined by the outer perimeter of the sealing ring, and means extending through at least one mounting aperture formed in the web of the sealing ring for permanently interconnecting the pair of mounting rings so that the sealing ring is captured therebetween in a fixed position relative to the mounting rings, at least one of the mounting rings being rigidly attached to the filler neck in a predetermined position in the filler neck passageway in spaced relation to the mouth of the filler neck.

6. The assembly of claim 5, wherein an outer diameter defined by the outer perimeter of the sealing ring is greater than an inner diameter defined by the inner wall of the filler neck, causing the outer perimeter edge of the sealing ring to establish a circumferentially extending fluid and vapor seal around an annular portion of the inner wall of the filler neck in spaced-apart relation to the filler neck mouth.

* * * * *

UNITED STATES PATENT AND TRADEMARK OFFICE
CERTIFICATE OF CORRECTION

PATENT NO.   :   4,883,103

DATED        :   November 28, 1989

INVENTOR(S)  :   Emil Szlaga, Robert S. Harris, Robert H. Thompson

It is certified that error appears in the above-identified patent and that said Letters Patent is hereby corrected as shown below:

On the bibliography page, under the heading "Related U.S. Application Data", please delete "4,707,164" and insert therefor --4,770,677--;

At column 2, line 67, please delete "enck" and insert therefor --neck--;

At column 4, line 37, please delete "72" and insert therefor --52--; and

At column 6, lines 17-18, please delete "appication" and insert therefor --application--.

Signed and Sealed this

First Day of January, 1991

Attest:

HARRY F. MANBECK, JR.

Attesting Officer        Commissioner of Patents and Trademarks